(12) United States Patent
Keshavaraj

(10) Patent No.: US 6,585,293 B2
(45) Date of Patent: Jul. 1, 2003

(54) LOW PERMEABILITY AIRBAG AND METHOD

(75) Inventor: Ramesh Keshavaraj, Peachtree City, GA (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 10/195,298

(22) Filed: Jul. 15, 2002

(65) Prior Publication Data

US 2003/0030262 A1 Feb. 13, 2003

Related U.S. Application Data

(63) Continuation of application No. 09/836,034, filed on Apr. 17, 2001.

(51) Int. Cl.$^7$ .............................................. B60R 21/16
(52) U.S. Cl. ................. 280/743.1; 280/729; 280/730.2; 280/749
(58) Field of Search ........................ 280/743.1, 730.2, 280/749, 729

(56) References Cited

U.S. PATENT DOCUMENTS

| | | | |
|---|---|---|---|
| 3,638,755 A | 2/1972 | Sack | 181/36 R |
| 3,814,458 A | 6/1974 | Acs | 280/150 AB |
| 4,946,291 A | 8/1990 | Schnaars | 383/113 |
| 5,114,180 A | 5/1992 | Kami et al. | 280/743 |
| 5,480,181 A | 1/1996 | Bark et al. | 280/730.2 |
| 5,499,743 A | 3/1996 | Blumenkron | 222/107 |
| 5,746,446 A | 5/1998 | Breed et al. | 280/743.1 |
| 5,806,983 A | 9/1998 | Millon et al. | 383/113 |
| 5,909,895 A | 6/1999 | Iino et al. | 280/743.1 |
| 6,129,377 A | 10/2000 | Okumura et al. | 280/730.2 |

FOREIGN PATENT DOCUMENTS

DE 212019 7/1908

*Primary Examiner*—Eric Culbreth
(74) *Attorney, Agent, or Firm*—Terry T. Moyer; Thomas L. Moses

(57) ABSTRACT

An airbag having low gas permeability characteristics. The airbag is formed from two separate layers of material, an inner layer having low air permeability and an outer strength layer enclosing the inner layer, where the layers are only attached together along seam lines. The inner layer is made from a film material, preferably urethane. The outer layer is formed from a fabric.

8 Claims, 3 Drawing Sheets

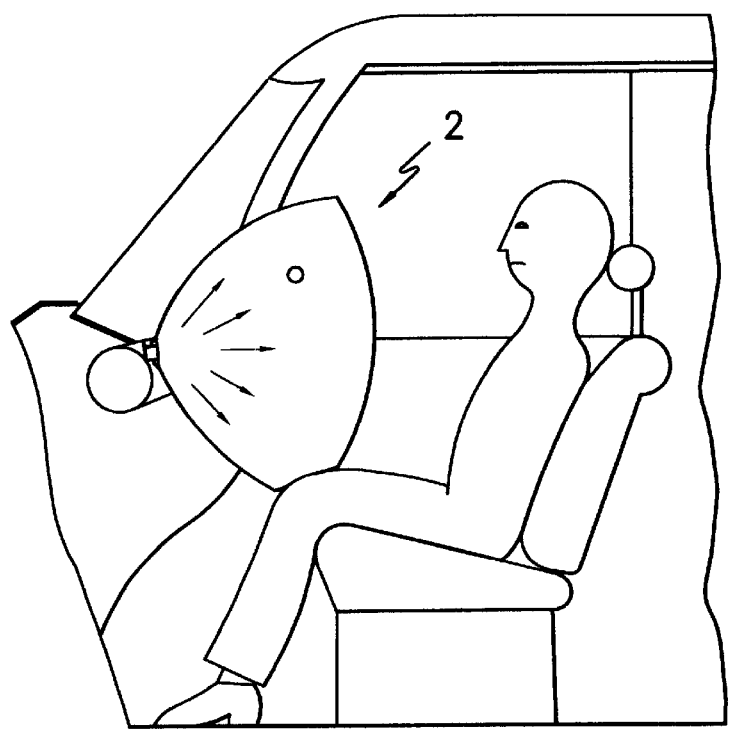
FIG. -1-
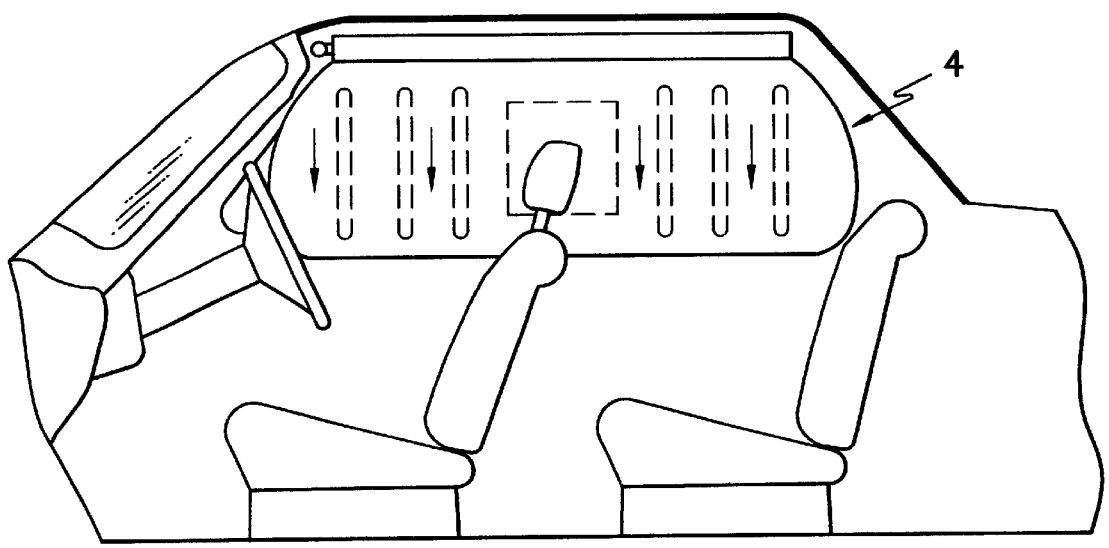
FIG. -1A-

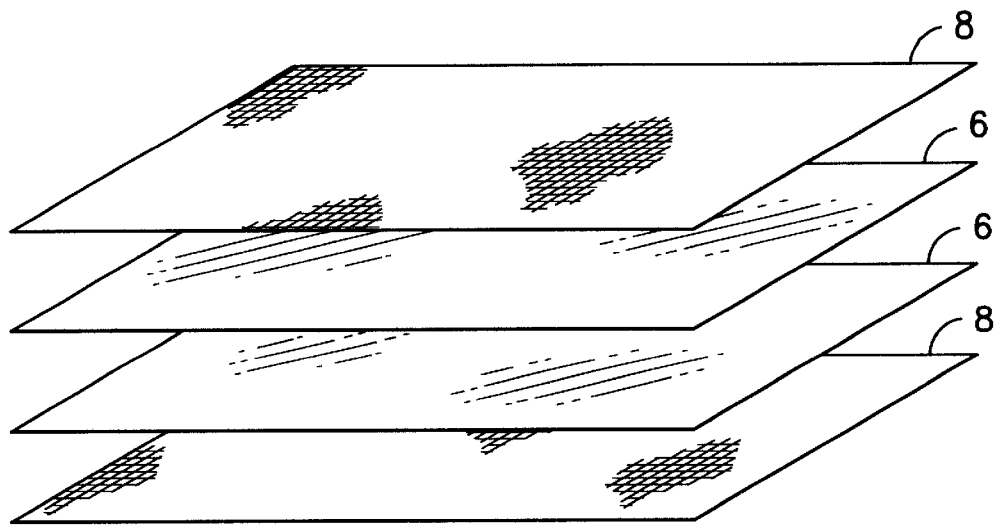
FIG. -2-
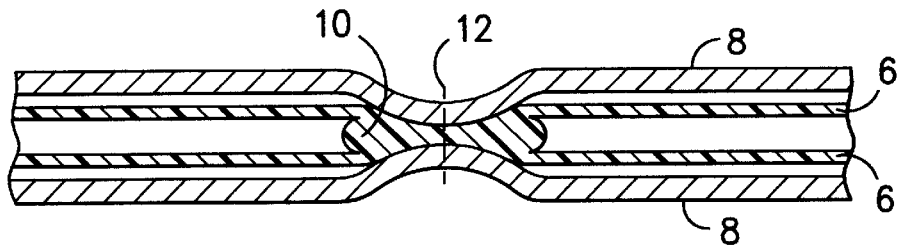
FIG. -3-
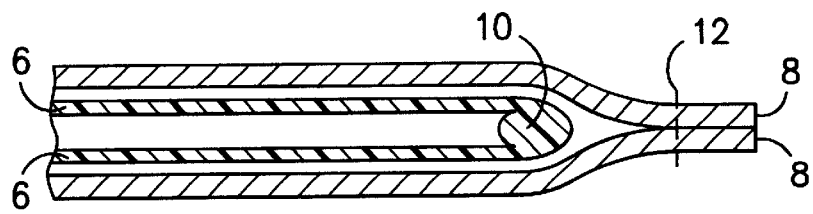
FIG. -3A-

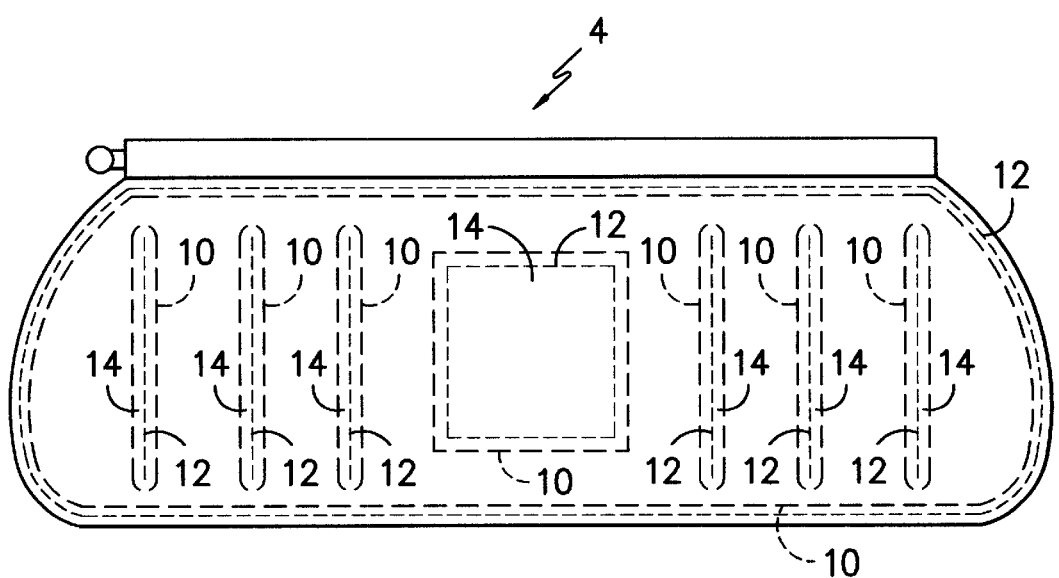
FIG. —3B—

LOW PERMEABILITY AIRBAG AND METHOD

This application is a continuation application based on U.S. application Ser. No. 09/836,034, filed Apr. 17, 2001.

BACKGROUND OF THE INVENTION

The present invention relates to low permeability airbags. More specifically, the present invention relates to airbags that are required to stay inflated for extended periods of time in order to protect occupants in a vehicle in the event of a sustained collision event, such as a rollover. An example of such an airbag is a side curtain airbag.

Traditional airbags are manufactured by means of sewing panels of fabric together to form a substantially enclosed, three dimensional bag, where the only substantial opening in the bag (other than vents) is designed to receive the inflator means. Typically, airbags are made from woven fabrics, and bags of desired shape have been produced by sewing panels of various shapes and dimensions. Sewn seams may be adequate for some driver and passenger applications because the required time for gas retention on these bags is less than one second.

This manufacturing method is unsuitable for side curtain airbags, and the like, because the holes created in the fabric by the sewing process allow gas to leak out, which reduces the gas retention time to unacceptable levels. Further, in order to obtain fabrics having low air permeability, it has generally been necessary to apply a heavy coating or lamination to the fabric, which is a costly step in the manufacturing process.

One solution that has been proposed to address this leakage issue is to attach the fabric panels together through welding means. While this method may prevent or reduce leakage at the seams, the fabric must still be heavily coated or laminated, and it has proven difficult to weld fabric directly to fabric.

Thus, it would be desirable to provide an airbag having low air permeability, which would not allow significant gas leakage at the seams thereof, and which would not require a minimal amount of lamination or coating on the face of the airbag fabric or substrate.

OBJECTS OF THE INVENTION

Accordingly, it is an object of the present invention to provide a low permeability airbag cushion that prevents or reduces leakage along the seams thereof.

Another object of the present invention is to provide a low gas permeability airbag cushion that reduces the use of costly laminates and coatings that must be applied to a face of the airbag fabric.

Yet another object of the present invention is to provide a low gas permeability airbag cushion having an inner bag enclosed in an outer bag, thus forming a double-layered airbag cushion.

Yet another object of the present invention is to provide a low cost fabric or non-woven on the outside, but having a low permeability inner cushion. The fabric component functions primarily as a strength provider rather than as a means to impart low permeability.

Another object of the present invention is to provide an inner bag enclosed in an outer bag, thus forming a double-layered airbag cushion that could be used on the driver, passenger, or side airbag applications.

Still another object of the present invention is to provide a method for producing a low gas permeable airbag, wherein the process prevents the airbag from being punctured in such a way that would allow leakage along the seams thereof.

Another object of the present invention is to provide an inexpensive airbag cushion and method for manufacturing such an airbag cushion, which minimizes or eliminates the use of expensive coatings and laminates, and which addresses other problems associated with the manufacture and production of airbag cushions having low gas permeability characteristics.

BRIEF DESCRIPTION OF THE DRAWINGS

These and other features, aspects, and advantages of the present invention will become better understood with regard to the following description, appended claims, and accompanying drawings where:

FIG. 1 shows a driver side airbag made in accordance with the present invention;

FIG. 1A shows a side curtain airbag made in accordance with the present invention;

FIG. 2 shows a cross sectional cut-out portion of an airbag made in accordance with the present invention, illustrating the two inner layers of film sandwiched between the two outer layers of fabric, wherein the air pocket is formed within the film layers, creating an airbag having an inner film layer and an outer fabric layer;

FIG. 3 shows a cross section of a heat welded seam, where the four layers of shown in FIG. 2 are heat welded together, and a seam is sewn through the four layers along and through the polymeric bead formed by the heat welding process;

FIG. 3A shows a cross section of an alternate embodiment of the invention, where the inner film layers are heat welded together, and the outer layers are sewn together, so that the resulting inner film layer is disposed within the resulting outer fabric layer, without being attached directly thereto;

FIG. 3B shows a side airbag curtain having inflation control areas, where the perimeter of the outer layer is sewn only through the outer layers, as shown in FIG. 3A, and where the inner film layers are heat welded together to form inflation control areas, and further showing a sewn seam positioned within the inflation control areas attaching the outer layers to the inner layers.

DETAILED DESCRIPTION

FIG. 1 shows a driver side airbag 2 having low gas permeability characteristics. The airbag is formed from two separate layers of material, an inner layer and an outer layer enclosing the inner layer, where the layers are only attached together along seam lines. The inner layer is preferably made from a film material, more preferably urethane, and is primarily used to provide a low air permeability layer to the airbag. The outer layer is preferably formed from a fabric, and serves primarily to enhance the strength characteristics of the airbag. FIG. 1A shows a side curtain airbag 4, which may be formed similarly from an inner film layer and an outer fabric layer.

In a first method, the instant airbag is manufactured by stacking two separate layers of film 6 material between two separate layers of fabric material 8, as shown in FIG. 2. The two layers of film may be formed from two separate sheets (as shown), or may be formed from a single sheet folded over. Similarly, the two layers of fabric may be formed from two separate sheets (as shown), or may be formed from a single sheet folded over with the two layers of film stacked there between. The layers are then subjected to heat welding, or some other suitable attachment procedure, which forms the shape and the inner chambers of the bag. As used herein, the term "heat welding" means any method of sealing the layers of the airbag cushion together, which forms a polymeric bead or fused polymeric seal, including but not limited to such methods as radio-frequency bonding, ultrasonic bonding, induction welding, adhesive bonding, etc. In a preferred embodiment, the heat welding produces either a pair of polymeric beads spaced slightly apart or a continuous thick bead 10, forming the seams of the airbag cushion.

The polymeric bead 10 produced by the heat weld seals all four layers together, which results in the formation of a film bag within a fabric bag. Optionally, a stitched seam 12 may be sewn within the boundaries of each heat-welded seam through the polymeric bead 10, as shown in FIG. 3, in order to provide more strength. The stitched seam 12 may be applied either before the heat welding of the bag or after the heat welding of the bag. Because the stitching occurs within the polymeric bead 10 as shown, the holes punched in the bag as a result of this stitching do not allow gas to leak from the bag when the bag is inflated.

This arrangement allows the film bag to retain the gas when the bag is inflated, and prevents leakage through sewn seam holes, because none of the holes produced by the stitching step are produced on an inflated portion of the bag. The holes are only produced between or within the polymeric beads of the heat weld. The outer layer of fabric provides strength, and is only attached to the inner bag along the sealed seams thereof. The non-heat welded portions of the bags are not attached to each other, in the first embodiment.

Tests have been performed with a welded polyurethane film bag in a 420d uncoated fabric bag. The development sample was inflated to a peak pressure of 14 Psi, and the leak rate was measured. After 40 minutes, the bag pressured had dropped by about 0.6 Psi.

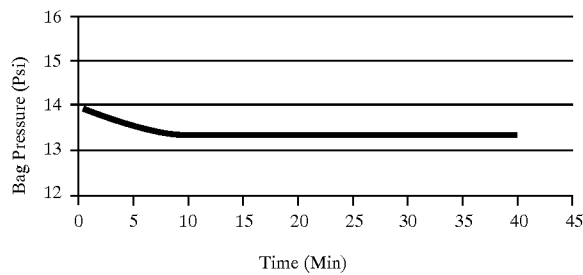

In a second method for manufacturing the instant airbag cushion, two layers of the film material are stacked, one layer on top of the other layer. As before, these layers may be formed from a single sheet folded over or two separate sheets. The two layers of film material are then heat sealed together to form a film bag. Then, the outer bag may be positioned to encompass the inner bag by stitching the outer bag outside the polymeric beads formed on the seams of the inner bag at the perimeter, as shown in FIG. 3A, and attached to the inner bag by stitching in-between or outside the polymeric beads in the inflation control areas 14 (other than perimeter seams) as shown in FIG. 3B. Such a side airbag may also include discrete vents (not shown) in the bag for energy dissipation.

In this method of manufacture, the outer bag is only connected to the inner bag by a stitched seam, and is not attached to the inner bag by means of heat welding. The outer bag may either be assembled onto the inner bag by stitching individual panels separately (or simultaneously) to the seams of the inner bag, or the outer bag may be assembled first with a small opening, and the inner bag may then be positioned within the pre-assembled outer bag for attachment thereto.

The sewn seam at the weld interface helps to transfer the stress away from the polymeric bead to the fabric, thus strengthening the airtight seam against gas leakage. The polymeric bead still retains its elongation properties after the weld is cooled, which helps to maintain the airtight structure. Although stitching has been set forth as the preferred method for attaching the outer bag to the inner bag in the second embodiment, it should be understood that other methods of attachment may be employed, including but not limited to suitable methods of bonding, adhesive, etc.

It should be understood that other film materials may be used, including but not limited to polyester, polyamides, polyolefin, etc. Similarly, other fabrics may be employed for the outer bag, including but not limited to woven, non-woven, weft-insertion, etc.

Although the present invention has been described in considerable detail with reference to certain preferred versions thereof, other versions are possible. Therefore, the spirit and scope of the appended claims should not be limited to the description of the preferred versions contained herein.

What is claimed is:

1. An airbag cushion comprising:
    a substantially enclosed inner bag made of a first material and including at least one seam where opposed portions of said first material are attached together by forming a polymeric bead therebetween to form a substantially enclosed bag; and
    an outer bag made of second material, said outer bag being attached to and enclosing said inner bag wherein said outer bag is sewn to said inner bag within the boundaries of said seam on said inner bag.

2. The airbag cushion set forth in claim 1, wherein said inner bag is made from material selected from the group consisting of urethane, polyamide, polyester, silicone, polyolefin, and any combinations thereof.

3. The airbag cushion set forth in claim 1, wherein said outer bag is made from material selected from the group consisting of woven fabric, non-woven material, weft inserted fabric, and any combinations thereof.

4. The airbag cushion set forth in claim 1, wherein said outer bag and said inner bag are heat welded together, thereby creating a seal binding said outer bag to said inner bag, and also binding opposed sides of said inner bag together in said seam.

5. The airbag cushion set forth in claim 1, wherein said outer bag and said inner bag are adhesively bonded together, thereby creating a seal binding said outer bag to said inner bag, and also binding said opposed sides of said inner bag together in said seam.

6. A method for manufacturing a multi-layer airbag cushion, said method comprising the steps of:
    providing an inner layer of material, said inner layer formed into a shape having a pocket for receiving and retaining gas under pressure;
    providing an outer layer of material;
    heat welding said inner layer to form chambers on an interior portion of said inner layer and
    disposing said inner layer within said outer layer;
    enclosing said outer layer about said inner layer; and
    attaching said outer layer to said inner layer.

7. The method set forth in claim 6, further including the step of sewing an outer perimeter of said outer layer together so that said perimeter seam does not include or penetrate said inner layer.

8. The method set forth in claim 6, including the step of sewing said outer layer to said inner layer within or adjacent to said heat welds forming said chambers.

* * * * *